Patented Jan. 27, 1931

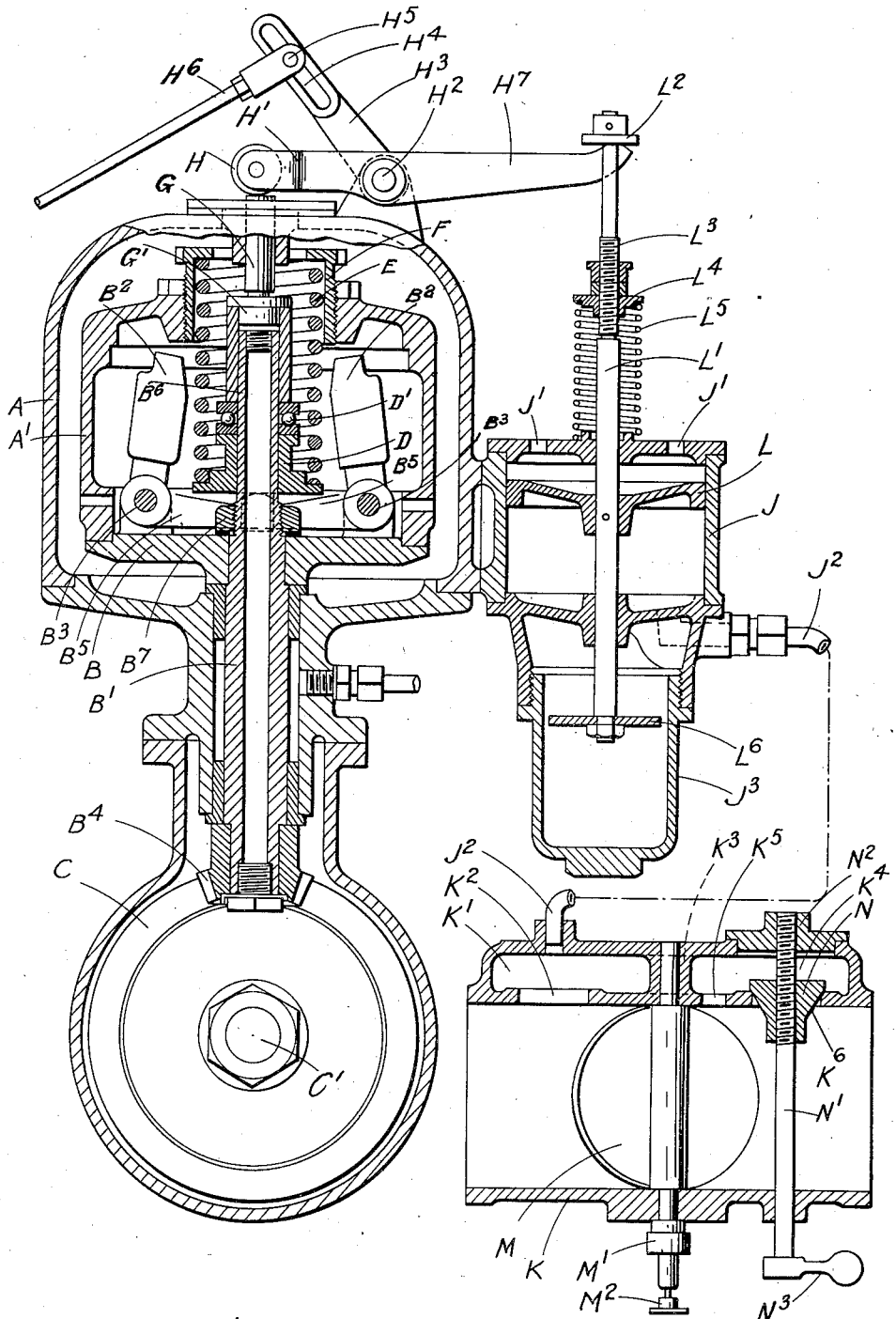

1,790,443

UNITED STATES PATENT OFFICE

HARRY RALPH RICARDO, OF LONDON, ENGLAND

MEANS FOR CONTROLLING INTERNAL-COMBUSTION ENGINES OF THE LIQUID-FUEL-INJECTION TYPE

Application filed December 21, 1928, Serial No. 327,721, and in Great Britain January 11, 1928.

This invention relates to means for controlling internal combustion engines of the fuel injection type and has for its object to ensure steady running of such engines when on light loads or idling.

It is a characteristic of engines of this type and more particularly those in which the fuel is injected by means of a pump of the class sometimes referred to as a "jerk pump", that the engine speed is apt to be unstable when running on light loads and at low speeds. This instability is due to the fact that under these conditions the delivery by the fuel pump when the latter is running at a fixed setting, increases rapidly with increase of speed so that any accidental small variation in speed tends to become magnified and violent "hunting" ensues. It is not practicable to control the engine satisfactorily under these conditions by the normal centrifugal full speed governor owing to the engine speed being then below that at which that governor comes into operation. By means of the present invention the engine can be controlled in a satisfactory manner when running at these lower speeds.

According to the present invention there is combined with governing mechanism of the centrifugal type operative to control the liquid fuel injection apparatus only when the engine speed exceeds a predetermined figure, mechanism actuated by the pressure in the induction pipe for controlling this apparatus when the engine speed falls below such figure as when idling or under light load, and means for bringing into operation this induction-pipe-pressure actuated mechanism as and when throttling takes place in the induction pipe for the supply of air to the cylinder or cylinders.

Thus, while there is a normal centrifugal governor control of the fuel supply to the cylinders, such control being operative only when the engine speed reaches or exceeds a predetermined figure, there is a supplementary control device for the fuel supply when the engine speed falls below such figure, as for instance when the engine is idling, such supplementary control device being brought into operation by closing wholly or partially a throttle in the air intake passage to the cylinder or cylinders whereby the necessary degree of depression can be caused therein.

Thus, when the engine is running under light loads or idling if there is any increase in the engine speed this will cause a rapid increase in the depression in the induction pipe or manifold owing to the throttling of the air supply and this decrease in pressure, operating through the control mechanism, will cause a reduction in the fuel supply and thereby check the rise in speed. When the engine is running under load, however, with the air supply unthrottled, the induction-pipe-pressure operated mechanism is inoperative since under these conditions variations in the engine speed do not produce appreciable variations in the pressure in this pipe, the control of the fuel supply apparatus then being effected in the normal manner by the centrifugal governing mechanism. The arrangement also serves to improve the combustion when the engine is running on light loads or idling owing to the reduction in the cylinder charge pressure at such times.

Conveniently all the cylinders draw their air supply through a common inlet manifold into which the air flows past a throttle valve which can be closed completely or to a less extent as desired, an auxiliary air inlet of suitable small dimensions being provided for the inflow of the necessary air supply when the main air intake passage is closed by the throttle. A pipe or passage runs from the manifold to a cylinder or chamber containing a piston, diaphragm or the like to which movement will be imparted by variations of pressure in the manifold. The movements of this piston or diaphragm are communicated through suitable mechanism to a fuel regulating device associated with the fuel supply pump. This fuel regulating device may be the same which is actuated by the normal centrifugal governor control when the engine is running at higher speeds or the auxiliary fuel control may be effected by a device separate or distinct from that actuated by the centrifugal governor. In either case, however, the arrangement is such that either of the fuel control devices can act on the fuel supply apparatus so as reduce the quantity of fuel delivered independently of the other whereby the fuel supply apparatus is always under the control of whichever of the two governor mechanisms is at the moment tending to cause the engine to run slower.

The invention may be carried into practice in various ways but one construction according to this invention is illustrated somewhat diagrammatically in sectional elevation by way of example in the accompanying drawing.

In the construction illustrated, the apparatus comprises a casing A containing a governor of the centrifugal type. This governor comprises a disc-like part B keyed or otherwise rigidly mounted on a sleeve $B^1$ and having governor weights $B^2$ pivoted thereto at $B^3$. The lower end of the sleeve $B^1$ carries a bevel pinion $B^4$ meshing with a second bevel pinion C on the crankshaft or other rotating part $C^1$ of the engine to which the apparatus is applied, whereby the sleeve $B^1$ and disc-like member B carrying the governor weights $B^2$ are rotated at a speed dependent upon the engine speed.

The governor weights $B^2$ are provided with inwardly extending arms $B^5$ which engage a collar D mounted to slide on an upward extension $B^6$ of the sleeve $B^1$. The collar D is acted upon by one end of a compression spring E the other end of which bears against an adjustable cap F screwed into the upper end of a casing $A^1$ rigidly mounted on the member B and enclosing the governor weights and their associated parts. Passing freely through the upper end of the casing A is a rod G the lower end of which engages a member $G^1$ mounted to slide freely on the part $B^6$ and to be acted upon by the collar D through a thrust bearing $D^1$. The sleeve $B^1$ carries a nut $B^7$ which limits the downward movement of the arms $B^5$ and sleeve D, and the compression of the spring E is so adjusted that the engine has to attain a certain speed before the weights $B^2$ can force the arms $B^5$ and sleeve D upward away from the nut member $B^7$. Thus the governor does not come into operation until the engine has reached a predetermined speed, such speed being variable at will by controlling the initial compression of the spring E, by adjusting the cap member F.

The upper end of the rod G acts on a roller H on the end of a lever $H^1$ which is pivoted at $H^2$ to the casing A. The lever $H^1$ is rigidly connected to its pivot $H^2$ and this pivot also carries an arm $H^3$ having a slot $H^4$ therein engaged by a pin $H^5$ on the end of a rod or link $H^6$ whereby the control of the fuel supply apparatus is effected.

The apparatus as so far described constitutes governing mechanism of the normal centrifugal type.

Associated with the centrifugal governing mechanism above described is a cylinder J one end of which is open to the atmosphere through holes $J^1$ while the other end communicates through a pipe $J^2$ with a passage K constituting the air inlet passage leading to the air inlet manifold of the engine to which the apparatus is applied.

Mounted to move within the cylinder J is a piston L having a piston rod $L^1$ extending through the upper end of the cylinder J and carrying at its upper end a collar $L^2$ which freely engages the end of a lever arm $H^7$ formed integral with the lever $H^1$. The rod $L^1$ is screwthreaded at $L^3$ to receive a correspondingly screwthreaded collar $L^4$ constituting an adjustable thrust member for a compression spring $L^5$ disposed between this collar and the upper end of the cylinder J. The lower end of the piston rod L extends through the lower end of the cylinder J and carries a disc-like piston $L^6$ disposed within a cylinder $J^3$ so as to leave a small clearance between it and the cylinder whereby this member $L^6$ acts as a dash-pot to prevent sudden movement of the rod $L^1$.

The pipe $J^2$ enters a pocket $K^1$ in the wall of the induction pipe K communicating through an opening $K^2$ with the portion of the induction pipe on the engine side of a throttle valve M of the butterfly type the spindle of which carries an arm $M^1$ whereby the throttle valve can be opened or closed. The arm $M^1$ conveniently carries a spring-pressed locking plunger $M^2$ for retaining the throttle valve in either its open or closed position when desired.

The pocket $K^1$ communicates through a passage $K^3$ with a second pocket $K^4$ having two openings $K^5$, $K^6$ communicating with the interior of the induction pipe K on the atmosphere side of the throttle valve M. One of the openings $K^5$ is always open and thus always permits a limited quantity of air to flow through the pockets $K^4$, $K^1$ and the opening $K^2$ to the portion of the induction pipe on the engine side of the throttle valve even when this valve is closed. The opening $K^6$ on the other hand is controlled by a conical valve N rigidly carried upon a spindle $N^1$ which is mounted in the induction pipe K, this spindle being screwthreaded at one end to engage a correspondingly screwthreaded bore in a member $N^2$ and carrying at its other end a handle $N^3$ whereby it can be manually rotated. This rotation of the rod $N^1$ causes it to move longitudinally to vary the effective area of the opening $K^6$ and hence the quantity of air which can flow through the pockets $K^4$, $K^1$ and the opening $K^2$ to the engine when the throttle valve M is closed.

The operation of the apparatus is as follows.

Suppose the engine to be running under load with the throttle M open, then there is no appreciable depression in the induction pipe K so that the piston L moves upwards to its full extent into the position shown in the drawing, in which it is inoperative on the lever $H^7$ since the roller $H^1$ bears on the member G when the governor weights $B^2$ are in their innermost position. Thus, the engine will be under the control only of the centrifugal governor through the sleeve D, member G, levers $H^1$ and $H^3$ and the rod $H^6$, the lever $H^7$ being free to move downwards away from the collar $L^2$.

When the engine is idling, however, or running under light load, the throttle valve M is closed thus causing a depression in the portion of the induction pipe K on the engine side of this valve, a limited quantity of air being permitted to flow to this part of the induction pipe, however, through the openings $K^5$ and $K^6$ and the pockets $K^4$, $K^1$. The depression thus created in the pocket $K^1$ acts through the pipe $J^2$ to move the piston L downwards and thus through the piston rod $L^1$ and collar $L^2$ to rock the levers $H^7$, $H^3$ to reduce the quantity of fuel injected into the cylinders. The engine speed is thus reduced to such an extent that the governor weights $B^2$ occupy their innermost inoperative position so that the lever arm $H^1$ $H^7$ is solely under the control of the induction pipe pressure operated piston L. During this period of slow running it will be seen that any increase in the engine speed will result in an increased depression in the induction pipe whereby the piston L will be moved to reduce the quantity of fuel injected to check such speed increase, a decrease in engine speed similarly resulting in a decreased depression and a corresponding increase in the fuel injection to check such decrease in speed. The dashpot device $L^8$, $J^3$ acts to steady the movement of the piston L and prevent hunting. Further by varying the effective area of the opening $K^6$, the depression in the pocket $K^1$ for a given speed and hence the idling speed of the engine can be controlled. Again by adjusting the effective force of the springs E and $L^5$ the point at which the two governing devices respectively come into action can be varied.

The member $H^6$ conveniently controls the quantity of fuel supplied to the cylinders in some known manner for example by varying the movement or range of movement of a spill or by-pass valve actuated against the action of a spring by a tappet so as to vary the proportion of fuel delivered by a plunger pump which is by-passed on each pump stroke and hence the quantity of fuel delivered to the sprayer or sprayers in each cylinder. For example the rod $H^6$ may act to move a wedge-shaped member interposed between the stem of a spill valve of the poppet type and the tappet which operates such valve so as to vary the proportion of each pump plunger stroke during which such valve is open.

It is to be understood that the construction described above is given by way of example only and that constructional details may be considerably varied without departing from this invention.

What I claim as my invention and desire to secure by Letters Patent is:—

1. In an internal combustion engine of the liquid fuel injection type the combination with centrifugal governing mechanism which comes into effective operation only when the engine speed exceeds a predetermined value, of means whereby this mechanism when in effective operation can control the quantity of fuel injected, an induction passage for delivering air to the engine, a member subjected to and movable by variations in the pressure in the induction passage this member coming into effective operation only when such pressure falls below a predetermined value, means whereby this member when in operation controls the quantity of fuel injected, and means for throttling the induction passage when the engine speed is to be reduced so as to reduce the pressure in the induction passage and bring the said member into effective operation.

2. In an internal combustion engine of the liquid fuel injection type the combination with a control member for varying the quantity of fuel delivered to the engine, of centrifugal governing mechanism which comes into effective operation only when the engine speed exceeds a predetermined value, an operative connection between this mechanism and the control member, an induction passage for delivering air to the engine, a member subjected to and movable by variations in the pressure in the induction passage, this member coming into effective operation only when such pressure falls below a predetermined value, means for throttling the induction passage when the engine speed is to be reduced so as to reduce the pressure in the induction passage and bring the said member into effective operation, and an operative connection between such member and the control member.

3. In an internal combustion engine of the liquid fuel injection type the combination with centrifugal governing mechanism which comes into effective operation only when the engine speed exceeds a predetermined value, of means whereby this mechanism when in effective operation can control the quantity of fuel injected, an induction passage for delivering air to the engine, a member subjected to and movable by variations in the pressure in the induction passage, this member coming into effective operation only when such pressure falls below a predetermined value, a throttle valve in the induction passage adapted to close this pipe, at least one supplementary air inlet passage opening into the induction passage on the engine side of the throttle valve and of such dimensions as to permit a limited quantity of air to flow to the engine through this passage while causing the desired depression therein to bring into effective operation the member controlled by variations in the pressure in the induction passage.

4. In an internal combustion engine of the liquid fuel injection type the combination with apparatus, a control member for varying the quantity of fuel delivered to the engine, centrifugal governing mechanism which comes into operation only when the engine speed exceeds a predetermined value, an operative connection between this mechanism and the control member, an induction passage for delivering air to the engine, a member subjected to and movable by variations in the pressure in the induction passage, this member coming into effective operation only when such pressure falls below a predetermined value, a throttle valve in the induction passage adapted to close this pipe, and at least one supplementary air inlet passage opening into the induction passage on the engine side of the throttle valve and of such dimensions as to permit a limited quantity of air to flow to the engine through this pipe while causing the desired depression therein to bring into effective operation the member controlled by variations in the pressure in the induction passage.

5. In an internal combustion engine of the liquid fuel injection type the combination with centrifugal governing mechanism which comes into effective operation only when the engine speed exceeds a predetermined value, of means whereby this mechanism when in effective operation can control the quantity of fuel injected, an induction passage for delivering air to the engine, a member subjected to and movable by variations in the pressure in the induction passage, this member coming into effective operation only when such pressure falls below a predetermined value, a throttle valve in the induction passage adapted to close this pipe, at least one supplementary air inlet passage opening into the induction passage on the engine side of the throttle valve and of such dimensions as to permit a limited quantity of air to flow to the engine through this passage while causing the desired depression therein to bring into effective operation the member controlled by variations in the pressure in the induction passage, and means for controlling the effective cross-sectional area of the supplementary air inlet passage.

6. In an internal combustion engine of the liquid fuel injection type the combination with a control member for varying the quantity of fuel delivered to the engine, of centrifugal governing mechanism which comes into operation only when the engine speed exceeds a predetermined value, an operative connection between this mechanism and the control member, an induction passage for delivering air to the engine, a member subjected to and movable by variations in the pressure in the induction passage, this member coming into effective operation only when such pressure falls below a predetermined value, a throttle valve in the induction passage adapted to close this passage, at least one supplementary air inlet passage opening into the induction passage on the engine side of the throttle valve and of such dimensions as to permit a limited quantity of air to flow to the engine through this passage while causing the desired vibration therein to bring into effective operation the member controlled by variations in the pressure in the induction passage, and means for controlling the effective cross-sectional area of the supplementary air inlet passage.

In testimony whereof I have signed my name to this specification.

HARRY RALPH RICARDO.